(12) United States Patent
Kazmi et al.

(10) Patent No.: US 10,034,205 B2
(45) Date of Patent: Jul. 24, 2018

(54) POSITIONING MEASUREMENTS AND CARRIER SWITCHING IN MULTI-CARRIER WIRELESS COMMUNICATION NETWORKS

(75) Inventors: Muhammad Ali Kazmi, Bromma (SE); Iana Siomina, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1461 days.

(21) Appl. No.: 12/897,915

(22) Filed: Oct. 5, 2010

(65) Prior Publication Data

US 2012/0083278 A1    Apr. 5, 2012

Related U.S. Application Data

(60) Provisional application No. 61/388,845, filed on Oct. 1, 2010.

(51) Int. Cl.
*H04W 36/06* (2009.01)
*H04W 64/00* (2009.01)
(Continued)

(52) U.S. Cl.
CPC ............ *H04W 36/06* (2013.01); *H04W 64/00* (2013.01); *H04W 4/02* (2013.01); *H04W 36/08* (2013.01); *H04W 36/32* (2013.01)

(58) Field of Classification Search
CPC ..... H04W 64/00; H04W 76/007; H04W 4/22; H04W 36/0083; H04W 36/0094;
(Continued)

(56) References Cited

U.S. PATENT DOCUMENTS 6,295,455 B1 * 9/2001 Fischer et al. .............. 455/456.2
8,417,264 B1 * 4/2013 Whitney et al. ........... 455/456.2
(Continued)

FOREIGN PATENT DOCUMENTS

CN    101730222 A    9/2010
EP    09/42615 A1    2/1999
(Continued)

OTHER PUBLICATIONS

St-Ericsson; Ericsson, "Impact on Positioning Measurement Requirements With Carrier Aggregation", 3GPP TSG-RAN WG4 Meeting #57, R4-104504, pp. 1-3, Nov. 15-19, 2010, Jacksonville, FL USA.
(Continued)

*Primary Examiner* — Olumide T Ajibade Akonai
(74) *Attorney, Agent, or Firm* — Coats & Bennett, PLLC (57) ABSTRACT

In a multi-carrier wireless communication network, positioning-aware switching of a primary carrier from a first carrier to a second carrier for a UE is constrained to enable one or more positioning measurements to be performed. Either the selection of the second carrier, the timing of switching from the first to the second carrier, or both, are constrained to enable and enhance the positioning performance. The constraints may be operative at a serving node of the network, at a UE, or both. Further constraints may be applied to the network to enhance positioning performance. Carrier switching may be across Radio Access Technology (RAT), and the positioning constraints may include configuring or re-configuring a device to perform positioning measurements in measurement gaps (e.g., on a secondary carrier in LTE systems when Positioning Reference Signals are not transmitted on the primary carrier).

31 Claims, 8 Drawing Sheets

(51) Int. Cl.
*H04W 36/08* (2009.01)
*H04W 36/32* (2009.01)
*H04W 4/02* (2018.01)

(58) Field of Classification Search
CPC . H04W 64/003; H04W 64/006; G01S 5/0236; G01S 5/0252; G01S 5/0242; G01S 19/05
USPC ......... 455/456.1, 456.2, 456.3, 456.4, 456.5, 455/456.6, 404.1, 404.2, 432.1, 435.1, 455/435.2, 435.3, 436–444; 342/450, 342/451, 457; 370/252, 328, 331, 338, 370/352
See application file for complete search history.

(56) References Cited

U.S. PATENT DOCUMENTS

| | | | | |
|---|---|---|---|---|
| 2005/0054294 | A1* | 3/2005 | Khun-Jush et al. | 455/63.1 |
| 2006/0221883 | A1 | 10/2006 | Damnjanovic et al. | |
| 2008/0310358 | A1* | 12/2008 | Shaheen | 370/329 |
| 2009/0022062 | A1* | 1/2009 | Wang et al. | 370/252 |
| 2009/0046641 | A1* | 2/2009 | Wang et al. | 370/329 |
| 2009/0247169 | A1 | 10/2009 | Kawasaki | |
| 2010/0069065 | A1* | 3/2010 | Sambhwani et al. | 455/434 |
| 2010/0120435 | A1* | 5/2010 | Mia et al. | 455/440 |
| 2010/0130227 | A1* | 5/2010 | Farthofer et al. | 455/456.1 |
| 2010/0202407 | A1* | 8/2010 | Edge | 370/331 |
| 2010/0240396 | A1* | 9/2010 | Zhang | G01S 5/0284 455/456.1 |
| 2010/0246534 | A1* | 9/2010 | Vargantwar et al. | 370/332 |
| 2010/0311437 | A1* | 12/2010 | Palanki et al. | 455/456.1 |
| 2010/0323683 | A1* | 12/2010 | Kazmi et al. | 455/422.1 |
| 2011/0085491 | A1* | 4/2011 | Tynderfeldt et al. | 370/315 |
| 2011/0158200 | A1* | 6/2011 | Bachu et al. | 370/330 |
| 2011/0261712 | A1* | 10/2011 | Park et al. | 370/252 |
| 2012/0172042 | A1* | 7/2012 | Drevon et al. | 455/436 |
| 2012/0295623 | A1* | 11/2012 | Siomina et al. | 455/436 |
| 2012/0302254 | A1* | 11/2012 | Charbit et al. | 455/456.1 |

FOREIGN PATENT DOCUMENTS

| | | |
|---|---|---|
| GB | 23/68240 A | 4/2002 |
| JP | 11355315 A | 12/1999 |
| JP | 2009239766 A | 10/2009 |
| JP | 2012509027 A | 4/2012 |
| RU | 2007139698 A | 5/2009 |
| WO | 2010/059003 A2 | 5/2010 |
| WO | 2010056949 A2 | 5/2010 |
| WO | 2010105254 A2 | 9/2010 |
| WO | 2012023897 A1 | 2/2012 |

OTHER PUBLICATIONS

Nokia Siemens Networks, et al., "Considerations for some LPP stage 2 outstanding issues," Agenda item 6.1.1., 3GPP TSG-RAN WG2 Meeting #67bis, R2-095985, Miyazaki, Japan, Oct. 12, 2009.

* cited by examiner

POSITIONING MEASUREMENTS AND CARRIER SWITCHING IN MULTI-CARRIER WIRELESS COMMUNICATION NETWORKS

RELATED APPLICATIONS

This application claims priority to U.S. Provisional Patent Application Ser. No. 61/388,845, titled, "Positioning Measurements and Carrier Switching in Multi-Carrier Wireless Communication Networks," filed Oct. 1, 2010.

TECHNICAL FIELD

The present invention relates generally to multi-carrier wireless communication networks, and in particular to positioning-aware primary carrier switching in multi-carrier networks.

BACKGROUND

The possibility of identifying user geographical location in wireless communication networks has enabled a large variety of commercial and non-commercial services, e.g., navigation assistance, social networking, location-aware advertising, emergency calls, and the like. Different services may have different positioning accuracy requirements imposed by the application. In addition, regulatory requirements exist in some countries on the positioning accuracy for basic emergency services, i.e., FCC E911 in US. Positioning methods include GPS or Assisted-GPS (A-GPS), for User Equipment (UE) or other devices which include a GPS receiver circuit. Since not all UE are equipped to receive and process GPS ranging signals, other positioning methods have been standardized by 3GPP, such as Observed Time Difference of Arrival (OTDOA), in which a UE measures the relative timing of reference signals transmitted from different base stations. The UE (or a location services network node) can then estimate the UE position based on the measured signal arrival timings.

An advance in wireless communication technology, which promises improved bandwidth and higher signal quality, is multi-carrier transmission, in which two or more signals are modulated onto different carrier frequencies and transmitted simultaneously. Generally, one carrier frequency (or simply "carrier") is designated as a primary carrier (also known as the anchor carrier), and other carriers are considered secondary carriers (also known as component carriers). For load balancing and other network management reasons, a network may switch the carriers for individual UEs—e.g., assigning a particular carrier as the primary carrier for one or more UEs, and a secondary carrier for other UEs. This carrier switching is dynamic, and may include switching primary carrier between different Radio Access Technologies (RAT), e.g., between LTE and HSPA.

In prior art multi-carrier wireless communication networks, the impact on the positioning measurements is not considered in primary carrier switching decisions. As a consequence, ongoing positioning measurements may be interrupted or delayed when carriers are switched. Furthermore, reference signals used in some positioning methods, such as OTDOA, are not transmitted on all carriers. Accordingly, a UE's primary carrier could be switched from a carrier transmitting Positioning Reference Signals (PRS) to a carrier that does not transmit PRS, forcing the UE (or other device) to obtain positioning measurements in measurement gaps on a secondary carrier. Positioning measurements obtained on a secondary carrier may have less stringent requirements, may be inconsistent, and may take longer to acquire and process than those obtained from a primary carrier transmitting PRS. This can adversely affect both the rapidity and quality/accuracy of UE positioning procedures.

SUMMARY

According to one or more embodiments described and claimed herein, in a multi-carrier wireless communication network, positioning-aware switching of a primary carrier from a first carrier to a second carrier for a UE is constrained to enable one or more positioning measurements to be performed. Either the selection of the second carrier, the timing of switching from the first to the second carrier, or both, are constrained to meet and further enhance the requested positioning performance, where the positioning performance may be described by a set of positioning QoS parameters, such as horizontal or vertical accuracy. The constraints may be operative at a serving node of the network, at a UE, or both. Further constraints may be applied to the network to enhance positioning performance, such as selection of positioning procedures when carrier switching additionally comprises Radio Access Technology (RAT) switching.

One embodiment relates to a method of positioning-aware carrier switching for a UE, by a serving node of the UE in a multi-carrier wireless communication network. A first carrier is assigned as a primary carrier for the UE. A second carrier is selected to be the primary carrier for the UE. The primary carrier for the UE is switched from the first carrier to the second carrier. At least one of the selecting and switching steps is constrained so as to enable one or more positioning measurements to be performed.

Another embodiment relates to a method of positioning-aware carrier switching by a UE operative in a multi-carrier wireless communication network. Communication signals are received on a first carrier as a primary carrier. One or more positioning measurements are performed. An indication is received from a serving node that the primary carrier is to be switched from the first carrier to a second carrier. The primary carrier is switched to the second carrier while preserving the ongoing positioning measurements.

Still another embodiment relates to a serving node of a multi-carrier wireless communication network. The node includes a transceiver operative to simultaneously transmit to a UE communication signals modulated onto two or more carriers, wherein a first carrier is designated as a primary carrier for a particular UE. The node also includes a controller operative to control the transceiver, and further operative to select a second carrier to be the primary carrier for the UE, and to control the transceiver to switch the primary carrier for the UE from the first carrier to the second carrier. The controller is further operative to constrain at least one of the selecting and switching operations so as to enable one or more positioning measurements to be performed.

Yet another embodiment relates to a UE operative in a multi-carrier wireless communication network. The UE includes a transceiver operative to simultaneously receive from a network node communication signals modulated onto two or more carriers, wherein a first carrier is designated as a primary carrier for the UE. The UE also includes a position measurement function in data communications relationship to the transceiver and operative to perform positioning measurements used in ascertaining a geographic location of the UE. The UE further includes a controller operative to control the transceiver and position measurement function, and further operative to switch from the first carrier to a second carrier as the primary carrier in response to signals received from the network node, while preserving ongoing positioning measurements.

DETAILED DESCRIPTION

Assisted-GPS Positioning

Figure 1:
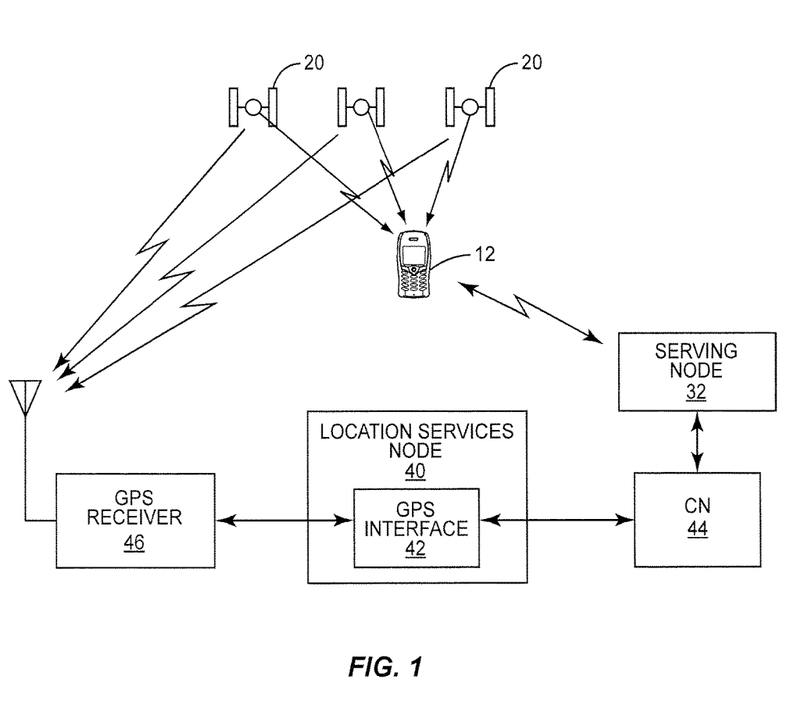
FIG. 1 is a functional block diagram of an Assisted-GPS positioning system in a multi-carrier wireless communication network.

In many environments, user position in a wireless communication network can be accurately estimated by using positioning methods based on the Global Positioning Navigational System (GNSS) examples of which include the Global Positioning System (GPS), Galileo, and the like. The GPS is presently a fully operational GNSS system. Many modern User Equipments (UE) include GNSS or more specifically GPS receiver circuits. In addition, modern networks may assist UEs in order to improve the terminal receiver sensitivity and GPS start-up performance, known as Assisted-GPS positioning, or A-GPS. FIG. 1 depicts a representative A-GPS multi-carrier wireless communication network 30. Both a UE 12 to be positioned, and a fixed network GPS receiver 46, receive ranging signals from a plurality of GPS satellites 20. A location services network node 40, including a GPS interface 42, provides assistance data, such as satellite 20 ephemeral data, to the UE 12 via a core network 44 and the UE's serving node 32 (e.g., an eNode-B). GPS or A-GPS receivers, however, may be not necessarily available in all wireless terminals. Furthermore, GPS is known to often fail in indoor environments and urban canyons. A complementary terrestrial positioning method, called Observed Time Difference of Arrival (OTDOA), has therefore been standardized by 3GPP. Enhanced cell identity (E-CID) based positioning method is another example of a terrestrial positioning method that has also been standardized by 3GPP.

Observed Time Difference of Arrival Positioning

Figure 2:
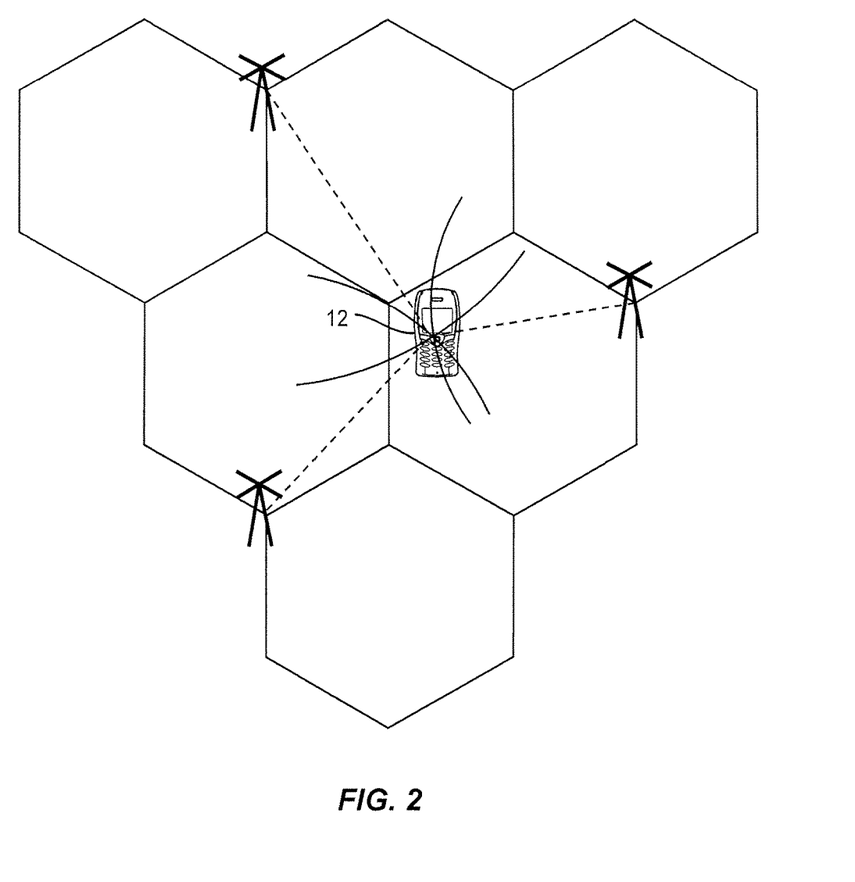
FIG. 2 is a functional block diagram of an Observed Time Difference of Arrival positioning system in a multi-carrier wireless communication network.

FIG. 2 depicts a UE 12 measuring the timing differences for downlink reference signals (depicted as dashed lines) received from multiple distinct locations in a multi-carrier wireless communication network. For each (measured) neighbor cell, the UE 12 measures the Reference Signal Time Difference (RSTD), which is the relative timing difference between each neighbor cell and the reference cell. The UE 12 position estimate is then found as the intersection of hyperbolas corresponding to the measured RSTDs. At least three measurements from geographically dispersed base stations with a good geometry are needed to solve for two coordinates of the terminal and the receiver clock bias. In order to solve for position, precise knowledge of the transmitter locations and transmit timing offset is needed. The position calculation can be performed by the UE 12 (UE-based positioning mode), or alternatively by a location services network node (UE-assisted positioning mode), such as the Enhanced Serving Mobile Location Center (E-SMLC) or Secure User Plane Location (SUPL) Location Platform (SLP) in the Long Term Evolution (LTE) 3GPP standard.

To enable positioning in LTE and facilitate positioning measurements of a proper quality and for a sufficient number of distinct locations, new physical signals dedicated for positioning, called Positioning Reference Signals (PRS) have been introduced, and low-interference positioning sub-frames have been specified in 3GPP. See the technical specification, 3GPP TS 36.211, "Evolved Universal Terrestrial Radio Access (E-UTRA); Physical Channels and Modulation."

Positioning Reference Signals

As explained in greater detail herein, in LTE systems, PRS are transmitted from one antenna port (R6) according to a pre-defined pattern. A frequency shift, which is a function of Physical Cell Identity (PCI), can be applied to the specified PRS patterns to generate orthogonal patterns and modeling the effective frequency reuse of six, which makes it possible to significantly reduce neighbor cell interference on the measured PRS, and thus improve positioning measurements. Even though PRS have been specifically designed for positioning measurements and in general are characterized by better signal quality than other reference signals, the standard does not mandate using PRS. Other reference signals, e.g. cell-specific reference signals (CRS), could in principle also be used for positioning measurements.

Figure 3:
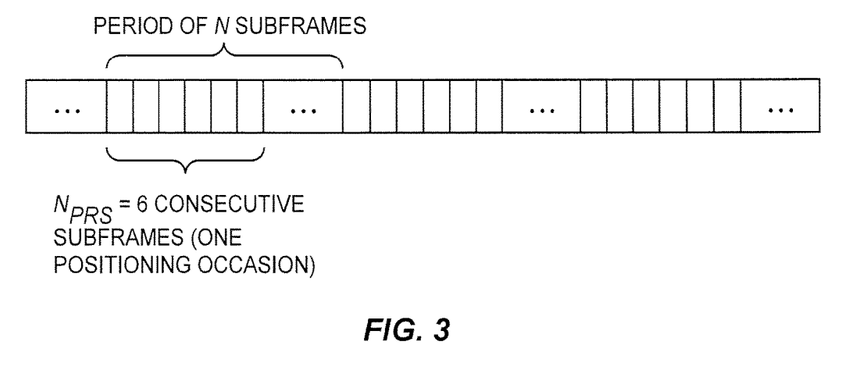
FIG. 3 is a frame diagram depicting Positioning Reference Signals assembled into sub-frames.

PRS are transmitted in pre-defined positioning sub-frames grouped by several consecutive sub-frames ($N_{PRS}$), known as one positioning occasion. Positioning occasions occur periodically with a certain periodicity of N sub-frames, i.e., the time interval between two positioning occasions, as depicted in FIG. 3. In LTE, the standardized periods N are 160, 320, 640, and 1280 ms, and the number of consecutive sub-frames are 1, 2, 4, and 6.

In Universal Mobile Telecommunications System (UMTS) Terrestrial Radio Access Network (UTRAN) Frequency Division Duplex (FDD) networks, System Frame Number (SFN)-SFN type 2 measurement performed by the UE 12 are used for the OTDOA positioning method. See the technical specification, 3GPP TS 25.215, "Physical Layer Measurements (FDD)." This measurement is the relative timing difference between cell j and cell i based on the primary Common Pilot Channel (CPICH) from cell j and cell i. In UTRAN, the UE-reported SFN-SFN type 2 measurement is used by the network 30 to estimate the UE 12 position.

The OTDOA and other positioning methods such as enhanced cell ID (E-CID) are to be used also for emergency calls. Hence the response time of these measurements should be as low as possible to meet the emergency call requirements.

Figure 4:
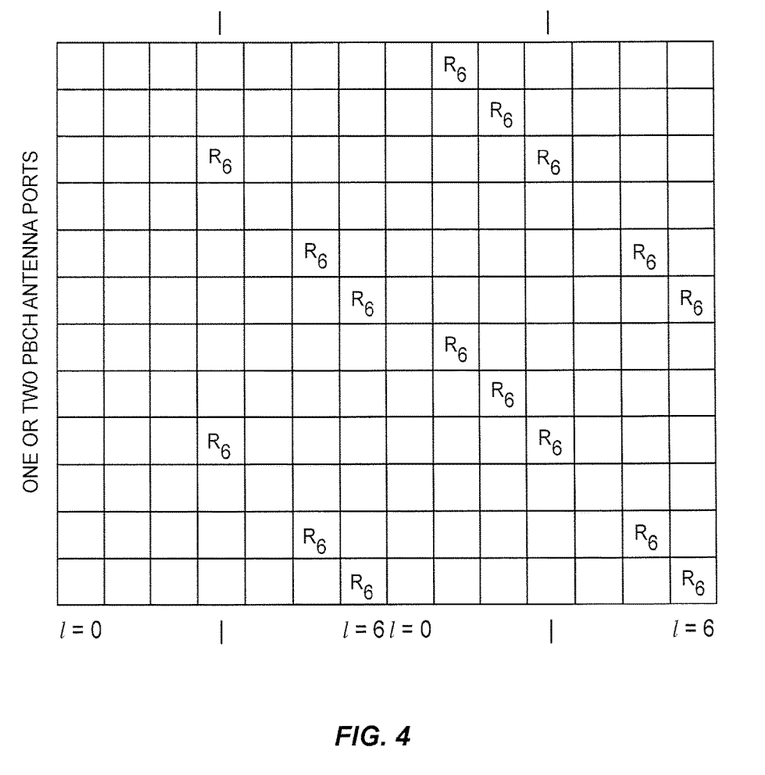
FIG. 4 is a time-frequency diagram of Positioning Reference Signals.

As discussed above, in LTE, the PRS are transmitted from one antenna port (R6) according to a pre-defined pattern. The currently specified PRS patterns are depicted in FIG. 4, where the squares denoted $R_6$ indicate PRS resource elements (REs) within a block of 12 subcarriers over 14 OFDM symbols (1 ms sub-frame with normal cyclic prefix). A set of frequency shifts can be applied to the pre-defined PRS patterns to obtain a set of orthogonal patterns which can be used in neighbor cells to reduce interference on PRS and thus improve positioning measurements. The effective frequency reuse of six can be modeled in this way. The frequency shift is defined as a function of Physical Cell ID (PCI) as follows, $$v_{shift}=\mathrm{mod}(PCI,6).$$

On a sub-frame basis, the PRS can also be transmitted with zero power, or can be muted.

To allow for detecting PRS from multiple sites and at a reasonable quality, positioning sub-frames have been designed as low-interference sub-frames (LIS). In general, data transmission is suppressed in positioning sub-frames. This means the Physical Downlink Shared Channel (PDSCH) shall not be transmitted to the UE 12 during the PRS sub-frames. Thus, in synchronous networks 30 PRS are ideally interfered only by PRS from other cells having the same PRS pattern index (i.e. same vertical shift $v_{shift}$) and not by the data transmissions.

In addition to the use of LIS, the PRS can also be transmitted during the sub-frames configurable for the Mobile Broadcast Single Frequency Network (MBSFN). These sub-frames do not contain user data, and only the first two OFDM symbols in each MBSFN sub-frame may contain common control channels (e.g., PDCCH) or physical signals (e.g., CRS). In LTE up to 6 downlink sub-frames in a frame can be configured for the MBSFN. In MBSFN sub-frames, the PRS pattern is specified in 2GPP TS 36.211. Due to absence of data transmissions, the interference is also reduced in these MBSFN sub-frames.

Since for OTDOA positioning PRS signals from multiple distinct locations need to be measured, the UE 12 receiver may have to deal with PRS that are much weaker than those received from the serving cell. Furthermore, without the approximate knowledge of when the measured signals are expected to arrive in time, or the exact PRS pattern, the UE 12 would need to do signal search within a large window, which would impact the time and accuracy of the measurements as well as the UE 12 complexity. To facilitate UE 12 measurements, the network 30 transmits assistance data to the UE 12, which includes, among other things, reference cell information, neighbor cell list containing PCIs of neighbor cells, the number of consecutive downlink sub-frames, PRS transmission bandwidth, frequency, and the like.

In LTE OTDOA, the UE 12 measures Reference Signal Time Difference (RSTD) which has been defined in the standard, i.e., 3GPP TS 36.214. The measurements are specified for both intra-frequency and inter-frequency and conducted in the RRC_CONNECTED state.

Enhanced Cell ID Based Positioning

The E-CID based method typically relies on more than one UE and/or base station measurements to determine the UE location. Examples of UE measurements in LTE are, e.g., cell identity reporting; UE Rx-Tx time difference measurement, which is measured by the UE from the serving cell; RSRP; RSRQ; etc. The cell identity reporting, RSRP, and RSRQ measurements are carried out by the UE from the serving and neighbor cells. Examples of base station (e.g., eNode B) measurements which are performed by the base station on the signals transmitted by the UE are, e.g., BS Rx-Tx time difference measurement; angle of arrival (AoA); Timing Advanced (TA) etc. The positioning node (e.g., E-SMLC in LTE) uses any combination of these measurements to determine the location of the UE 12.

Measurement Gaps

The UE 12 performs inter-frequency and inter-RAT measurements in measurement gaps. The measurements are done for various purposes: mobility, positioning, self organizing network (SON), minimization of drive tests, and the like. Furthermore the same gap pattern is used for all types of inter-frequency and inter-RAT measurements. Therefore, E-UTRAN must provide a single measurement gap pattern with constant gap duration for concurrent monitoring (i.e., cell detection and measurements) of all frequency layers and RATs. The E-UTRAN UE 12 supports two configurations consisting of the maximum gap repetition period (MGRP) of 40 and 80 ms; both with the measurement gap length of 6 ms. In practice, due to frequency switching time, less than 6 sub-frames, but at least 5 full sub-frames, are available for measurements within each such measurement gap.

In LTE, measurement gaps are configured (and re-configured as necessary) by the network 30 to enable measurements on the other LTE frequencies and/or other RATs (e.g., UTRAN, GSM, CDMA2000, etc). The gap configuration is signaled to the UE 12 over Radio Resource Control (RRC) protocol as part of the measurement configuration. Only one gap pattern can be configured at a time, and the network must re-configure the UE 12 to change the gap pattern. The same pattern is used for all types of configured measurements, e.g., inter-frequency neighbor cell measurements, inter-frequency positioning measurements, inter-RAT neighbor cell measurements, and inter-RAT positioning measurements.

In a multi-carrier LTE network 30, the measurement gaps may still be used for performing measurements on other RATs (e.g., GSM, UTRAN) or on non-configured LTE carrier frequencies (i.e., carriers not configured by RRC). The mobility measurements in LTE require UE 12 to perform measurements over the synchronization signals, i.e., primary synchronization signals (PSS) and secondary synchronization signals (SSS), and cell-specific reference signals (CRS) to enable inter-frequency handover and enhance system performance. Examples of LTE mobility measurements are Reference Signal Received Power (RSRP) and Reference Signal Received Quality (RSRQ).

In UTRAN FDD, the measurements on other UTRAN FDD carriers and on other RATs (e.g., LTE, GSM etc) are carried out in compressed mode (CM) gaps, which occur periodically. For example a CM gap pattern may consist of 10 UTRAN FDD slots (1 slot=0.67 ms) gap occurring every $2^{nd}$ frame (1 frame=10 ms). One main difference between UTRAN FDD and LTE is that in the former one CM pattern is used for each carrier, e.g., 2 CM patterns for measuring on two different UTRAN FDD carriers.

In multi-carrier High Speed Packet Access (HSPA) systems, depending upon the UE 12 capability, the CM gap pattern may still be required for measuring on other RATs and on other UTRAN FDD carriers.

Multi-Carrier Networks

A multi-carrier wireless communication network—also known as carrier aggregation (CA) or, e.g., Dual Cell (DC)—allows the UE 12 to simultaneously receive and/or transmit data over more than one carrier frequency. Each carrier frequency is often referred to as a component carrier (CC) or simply a serving cell in the serving sector, more specifically a primary serving cell or secondary serving cell. The multi-carrier concept is used in both HSPA and LTE.

Figure 5A:
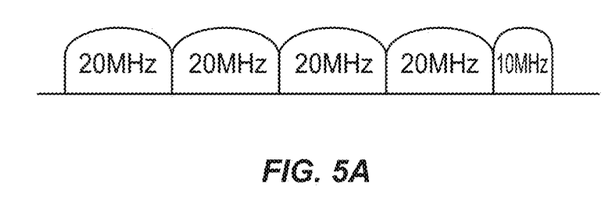
FIGS. 5A and 5B are frequency graphs showing aggregated spectrum in a multi-carrier wireless communication network.
Figure 5B:
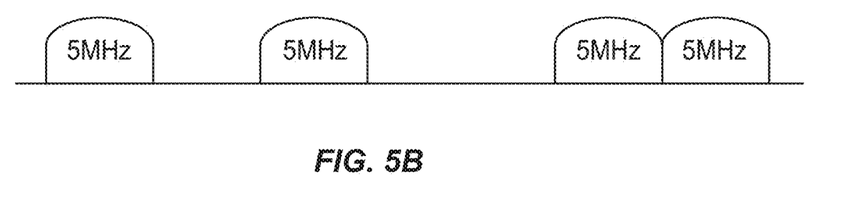

In an intra-RAT multi-carrier system (also known as single RAT multi-carrier system), all the component carriers belong to the same RAT, e.g., LTE FDD multi-carrier system, LTE TDD multi-carrier system, UTRAN FDD multi-carrier system, or UTRAN TDD multi-carrier system. In LTE multi-carrier systems, it is possible to aggregate a different number of component carriers, of different bandwidths and possibly in different frequency bands, in the uplink (UL) and the downlink (DL), as depicted in FIG. 5. FIG. 5A depicts an aggregated bandwidth of 90 MHz, comprising four 20 MHz carriers and one 10 MHz carrier. In FIG. 5A, all of the carriers are contiguous in frequency. FIG. 5B depicts an aggregated bandwidth of 20 MHz, comprising four non-contiguous carriers of 5 MHz each.

In a multi-carrier system, one of the component carriers is called the primary carrier or anchor carrier, and the remaining ones are called component carriers or secondary/supplementary carriers. The primary and secondary carriers are sometimes referred to in the art as the primary serving cell and secondary serving cell, respectively. The primary carrier carries all common and UE-specific control channels. The secondary carrier may contain only necessary signaling information and signals, e.g., those that are UE-specific may be not present in the secondary carrier, since both primary uplink and downlink carriers are typically UE-specific. This means that different UEs 12 in a cell may have different downlink primary carriers. Same is true for the uplink primary carriers. For example, in a multi-carrier system consisting of 2 DL carriers (F1_DL, F2_DL) and 2 UL carriers (F1_UL, F2_UL), some of the UEs 12 may be assigned F1_DL as the primary carrier, and remaining ones may have F2_DL as their primary carrier. The network is able to change the primary carrier of any UE 12 at any time. This is done, for example, to balance the load on different carriers.

The simultaneous transmission and/or reception of multiple carriers enable the UE 12 to significantly increase its data transmission and/or reception rates. For example, 2×20 MHz aggregated carriers in LTE multi-carrier system would theoretically lead to a two-fold increase in data rate, compared to that attained by a single 20 MHz carrier.

In LTE advanced, several contiguous and non-contiguous carrier aggregation scenarios are being considered. For example, in one scenario, five contiguous component carriers, each of 20 MHz (i.e., 5×20 MHz) is being considered for LTE TDD. Similarly, for LTE FDD, a scenario consisting of four contiguous component carriers, each of 20 MHz (i.e., 4×20 MHz) in the downlink and two contiguous component carriers in the uplink, is being studied.

In an inter-RAT multi-carrier system (also known as multi-RAT multi-carrier system), the component carriers may belong to different RATs in both uplink and downlink. For example, in such systems one component carriers may belong to LTE FDD and another one to LTE TDD. As another example, component carriers may belong to UTRAN FDD and E-UTRAN FDD. In such systems, one of the RATs may be considered as the main or primary RAT while the remaining ones are the auxiliary RATs. The anchor or primary carrier may typically belong to the primary RAT.

Figure 6:
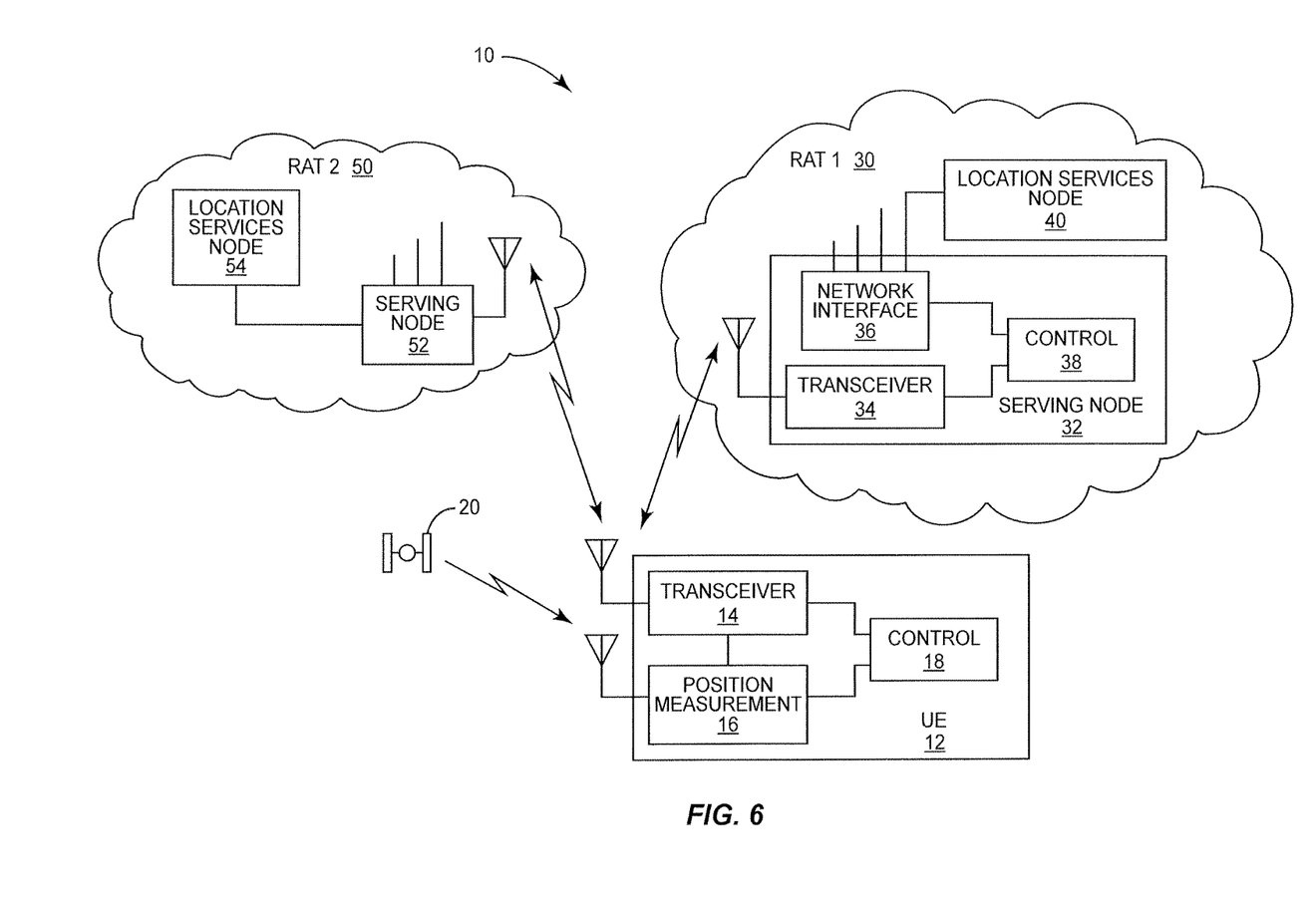
FIG. 6 is a functional block diagram of a multi-Radio Access Technology, multi-carrier wireless communication network.

FIG. 6 depicts a functional block diagram of a multi-RAT, multi-carrier wireless communication network 10. A UE 12 receives and transmits communication and control signals, modulated onto two or more carrier frequencies, according to a first RAT 30, from and to a serving node 32 in the first RAT 30, such as an eNode B in LTE. The serving node 32 comprises a multi-carrier transceiver 34 and a controller 38 operative to select a primary carrier and one or more secondary carriers for the UE 12, and further operative to switch the primary carrier as required or desired for optimal multi-carrier network operation. According to embodiments of the present invention, the controller 38 is constrained in its primary carrier selection and switching decisions in a positioning-aware manner, as described further herein, such that, e.g., ongoing positioning measurements are completed. The serving node 32 is connected, via a network interface 36, to a location services node 40, such as E-SMLC or SLP in LTE. The location services node 40 may perform positioning procedures for a UE 12 based on positioning measurements performed by the UE 12, such as GPS signal reception or OTDOA measurements of PRS.

The UE 12 additionally receives and transmits communication and control signals, modulated onto two or more carrier frequencies, according to a second RAT 50, from and to a serving node 52 in the second RAT 50. The serving node 52 is additionally connected to a location services node 54.

The UE 12 includes a multi-carrier transceiver 14 operative to simultaneously receive and/or transmit communication and control signals modulated onto two or more different carrier frequencies, under the control of a controller 18. The UE 12 additionally includes a position measurement function 16 operative to perform positioning measurements. The positioning measurements may, for example, comprise the receipt and processing of navigation signals from a satellite 20 (e.g., GPS), or may comprise the timing of PRS received by the transceiver 14 from a plurality of base stations 32, 52. The positioning measurement function 16 may further calculate estimates of the UE 12 position, or may transmit positioning measurements via the transceiver 14 to a location services node 40, 54 for position calculation. According to embodiments of the present invention, the controller 18 operates in a positioning-aware manner, as described further herein, such that, e.g., ongoing positioning measurements are completed.

Those of skill in the art will recognize that the controllers 18, 38 may comprise appropriately programmed processors or Digital Signal Processors (DSP). Furthermore, functional blocks, such as the position measurement function 16, may be implemented, in various embodiments, as hardware circuits (such as ASIC), as programmable logic circuits (e.g., FPGA) with appropriate firmware, as software modules executing on a processor such as the controller 18, or any combination of the above.

As discussed above, prior art multi-carrier wireless communication networks 10, whether intra-RAT or inter-RAT, do not consider the impact on positioning measurements when changing the primary carrier for a UE 12. Consequently, positioning measurements may be interrupted or delayed.

Another consequence of not considering positioning procedures when switching primary carriers is that a UE 12 may have to perform the positioning measurements in gaps or compressed mode pattern, e.g., if no PRS are available on the new primary carrier. The positioning measurements in gaps, which may have to be done on the secondary carrier, lead to longer delay and worse accuracy compared to that performed on the primary carrier. Furthermore, the network may need to re-configure the UE 12 for a new gap pattern, increasing signaling overhead.

Furthermore, the measurement requirements of UE measurements performed over the secondary component carriers (whether in measurement gaps or not) are less stringent compared to those done on the primary carrier. For example when a component carrier is deactivated, the measurement period of the measurement quantity becomes longer. This degrades performance. Additionally, the measurement results may be inconsistent when performing measurements over the secondary carrier, especially if the component carrier is frequently activated and deactivated.

According to embodiments of the present invention, carrier switching decisions in a multi-carrier wireless communication network 10 are constrained to ensure consistent and robust positioning measurement performance. These constraints may impact the selection carrier frequencies to be assigned to a UE 12 as a primary or secondary carrier, and/or may also impact the timing of the carrier switching. These constraints may operate on the serving network node 32, 52 (e.g., eNode-B), and/or the UE 12. For example, constraints may be imposed to ensure that switching the primary carrier occurs either prior to starting positioning measurement session or after the ongoing positioning measurement session is complete—i.e., that no primary carrier switching occurs during a positioning session or measurement period. As another example, primary carrier selection from among the component carriers may be constrained to select a carrier which transmit the PRS for enabling the UE 12 to perform positioning measurements—i.e., selecting a primary carrier having the most favorable configuration of PRS that can be used for positioning measurements (e.g., the one which transmits the largest density of PRS in time and/or frequency domains), or the carrier having the best possible propagation characteristics.

As further examples, constraints may trigger the transmission of PRS for positioning on a component carrier in response to the number of users for which the carrier is the primary carrier; selecting a positioning method in an inter-RAT, multi-carrier network 10 so as to avoid the need for gaps or compressed mode pattern; switching between positioning methods in an inter-RAT, multi-carrier network 10 when changing the primary carrier/RAT so as to avoid the need for gaps or compressed mode pattern; or signaling to other network nodes 40, 54 (e.g., location services nodes such as E-SMLC or SLP) about the primary carrier/RAT currently assigned to a UE 12.

In general, the positioning session is not limited to any specific method, but rather refers to any relevant method that require the UE 12 to perform positioning related measurements, such as OTDOA, E-CID, and the like. However, some embodiments relate to OTDOA, which requires positioning measurements on the PRS. Embodiments of the present invention impose constraints on the following aspects of primary carrier selection/switching operations:

Primary carrier switching procedures;
Primary carrier switching occasion;
Reconfiguring measurement gaps triggered by switching the primary carrier;
Primary carrier selection criteria;
Enabling of reference signals for positioning on a component carrier;
Enabling carrier hopping for enhancing positioning performance;
Positioning method selection in inter-RAT multi-carrier system;
Positioning method switching in inter-RAT multi-carrier system; and
Signaling of primary carrier information to positioning node.

Primary Carrier Switching Procedures

In one embodiment, the primary carrier switching operation is viewed as a type of handover procedure. For example, when a location service (LCS) session is ongoing, the primary carrier switching procedure follows the rules that apply for handover. In a further example, a positioning session is interrupted and restarted at handover.

Other embodiments constrain the switching of the primary carrier in a positioning-aware manner. The constrains may comprise one or more of the following:

Activating monitoring of positioning-related communications;
Deciding the primary carrier switching occasion, as discussed further herein;
Deciding the primary carrier, as discussed further herein;
Configuration/re-configuration procedures optimizing positioning performance, which may be triggered by carrier switching, such as configuring/re-configuring measurement gaps; changing the positioning configuration of a carrier; or switching positioning method.

To enable positioning-aware carrier switching, the network node 32, 52 responsible for the primary carrier switching (e.g., eNode B in intra-LTE multi-carrier) has to be aware of whether there is an on-going positioning session for the specific UE 12 or not. If the network node 32, 52 does not have any explicit information about whether or not there is an on-going positioning session for a certain UE 12, the attempt to switch the primary carrier may trigger one or more actions in the network node 32, 52 in order to obtain this information. Such actions may include extracting information by reading signaling messages (e.g., by sniffing other protocols which carry the information to/from the specific UE 12 and pass over the network node 32, 52 transparently); requesting the information from another node 40, 54 such as a location services network node (e.g., E-SMLC or SLP in LTE) or a network node controlling mobility procedures (e.g., MME in LTE); or requesting information from the UE 12.

In one embodiment, a UE 12 sends a message to a location services network node 40, 54 (e.g. E-SMLC) and/or radio network node 32, 52 (e.g., eNode B) indicating that an ongoing positioning session is aborted or terminated prematurely due to a primary carrier switch. In another embodiment, the UE 12 sends a message to the positioning node 40, 54 (e.g. E-SMLC) and/or radio network node 32, 52 (e.g., eNode B) indicating that it has switched the primary carrier while continuing the ongoing positioning session. It is then up to the network 10 (e.g. E-SMLC 40, 54) whether to send updated assistance data to the UE 12 for positioning measurements, or alternatively the network 10 can ask UE 12 to abort the ongoing positioning session. This embodiment may be particularly applicable to UE 12 which can perform positioning measurements on a secondary carrier without gaps, or if there are PRS transmitted on the new primary carrier. The UE 12 can acquire this information (i.e., whether the new primary carrier transmits PRS or not) from the assistance data, which is either old assistance data or new data sent after the primary carrier is switched.

The UE 12 behavior in these embodiments can be according to pre-defined rules. For example, one rule may state that the UE 12 shall abort an ongoing positioning procedure if the primary carrier is changed during the positioning session. Another rule may state that the UE 12 shall perform the primary carrier switch even if there is an ongoing positioning session, and continue the session. Yet another rule may state that the UE 12 shall perform the primary carrier switch even if there is an ongoing positioning session, and continue the session only if certain conditions are met—e.g., if the PRS are available and/or the UE 12 has updated assistance data.

In one embodiment, the UE 12 does not switch the primary carrier until the ongoing positioning session is completed. The UE 12 may also send a message to the network 10 (e.g., E-SMLC, eNode B) indicating that there is an ongoing positioning session and the primary carrier switching cannot be performed. In another embodiment, the UE 12 sends a message to the network 10 indicating that the primary carrier switch will be delayed until the positioning session is completed. In this case, the UE 12 may also indicate a time until which the primary carrier switching is delayed. The UE 12 behavior for these embodiments can be pre-defined, e.g., the UE 12 shall not perform the primary carrier switching while there is an ongoing positioning session, or the UE 12 shall perform the primary carrier switching after the completion of the ongoing positioning session. In one embodiment this may only apply to specific location services, e.g., emergency positioning or calls.

Primary Carrier Switching Occasion

Several types of positioning measurements—such as OTDOA RSTD in LTE or UTRAN FDD SFN-SFN type 2—are time critical, as they are typically used for emergency calls. In one embodiment, the network node 32, 52 (e.g. eNode B, RNC, etc.) responsible for switching or changing the primary carrier is constrained from switching the carrier during an ongoing positioning measurement session.

In one embodiment, the carrier switching is performed before the start of the positioning measurement session, e.g., prior the positioning session, the network node 32, 52 responsible for the switching checks whether carrier switching may be needed within a certain time (e.g., the estimated time for the positioning session or some pre-configured time). In another embodiment, the carrier switching is performed after the termination of the positioning measurement session, i.e., the carrier switching is postponed. This avoids interruption or delay in the positioning measurements.

Additional factors may also be taken into account in the primary carrier switching decision—that is, in deciding when to switch the primary carrier. First, the LCS session duration or the time elapsed since the LCS request may be considered. In this embodiment, the measurement session can be interrupted if the elapsed time does not exceed a certain threshold. Some special cases are i) infinity as one special case, i.e., primary carrier switching can always interrupt a positioning measurement session, and ii) zero as another special case, i.e., primary carrier switching never interrupts a positioning measurement session, but rather must always wait until the completion of the session.

Another factor may be the requested positioning performance, which may be measured by one or more metrics, such as horizontal accuracy, vertical accuracy, reporting time, and the like. Each of these metrics, or combinations thereof, may be compared to an appropriate positioning performance threshold to determine whether the requested positioning performance is met. In this embodiment, constraints apply to the primary carrier switching decision depending on the type of positioning request or measurement. For example, the primary switching constraints may be applicable only to the time-critical positioning requests (e.g., emergency calls) and may be relaxed for non-time critical requests (e.g., location requests). The constraints may not apply to accuracy-critical requests when the switching can provide a higher positioning accuracy. In case of non-critical requests, an abort message can then be sent, e.g. by UE 12 in case of a change of the primary carrier, while there is an ongoing positioning measurement session.

Reconfiguring Measurement Gaps Triggered by Switching the Primary Carrier

When the primary carrier changes (for positioning or non-positioning reasons) and positioning measurements on the secondary carrier can only be performed in measurement gaps or compressed gap patterns, then there may be a need to align the measurement gap with the transmission of PRS on the new secondary carrier, given that the gaps have been already configured for that UE 12. Aligning the measurement gap with PRS means that a sufficient number of PRS fall within the measurement gaps to facilitate positioning measurements (i.e., inter-frequency measurements which are typically done in the gaps).

Also, a pre-defined measurement gap pattern may be configured by the network node 32, 52 if the primary carrier change would cause the UE 12 to perform positioning measurements in the measurement gaps, e.g., if UE 12 will have to do to inter-frequency measurement. For example, the UE 12 may be configured with a specific measurement gap pattern for doing measurements (e.g., measurement gap pattern #0 in LTE, defined in 3GPP TS 36.133 and 3GPP TS 36.331 as 6 ms gaps occurring every 40 ms). As another example, the UE 12 may be re-configured with a specific measurement gap pattern for doing measurements (e.g., measurement gap pattern #0 in LTE) in case a different gap pattern is currently used (i.e. prior to the primary carrier switch).

The scenario in which the UE 12 has to use the measurement gaps for the measurements may occur if the PRS are not transmitted on the new primary carrier, but they are instead transmitted on the old primary carrier, which has become the new secondary carrier after the carrier switch. An example of the specific measurement gap pattern is the gap pattern #0 defined in 3GPP TS 36.133. Such a rule to use a specific measurement gap pattern when primary carrier is switched can be pre-defined. The network node 32, 52, e.g., eNode B will have to configure or re-configure the pre-defined gap pattern and the UE 12 will have to use this pre-defined gap pattern for the measurements.

In another embodiment a pre-defined rule may by that a multi-carrier capable UE 12 uses the measurement gaps or a specific measurement gap pattern (e.g., pattern #0) for performing the positioning measurements when the PRS for performing the positioning measurements are not transmitted on the primary carrier in a multi-carrier system. Alternatively, a pre-defined rule may be that a multi-carrier capable UE 12 performs the positioning measurements without measurement gaps on the primary carrier provided the PRS are transmitted on the primary carrier.

In another embodiment a pre-defined rule may be that after the downlink primary carrier is changed, a multi-carrier capable UE continues performing the positioning measurements without measurement gaps on the new primary carrier provided the PRS are transmitted on the new primary carrier.

In another embodiment a pre-defined rule may be that after the downlink primary carrier switch, in case the PRS are transmitted on the primary carrier and at least on one secondary carrier, then a multi-carrier capable UE 12 continues performing the positioning measurements without measurement gaps on the new primary carrier.

Primary Carrier Selection Criteria

In a multi-carrier network 10 all component carriers may not transmit the reference signals for performing the positioning measurements, notably OTDOA measurements, e.g., OTDOA RSTD in LTE.

In the prior art, the new primary carrier is selected without any regard to the presence or absence of the positioning reference signals, even for location services known to use the positioning references signals. This has a consequence of either the UE 12 has to continue the positioning measurements in gaps after the primary carrier is changed in case the new primary carrier does not contain the positioning reference signals, or the UE has to perform positioning measurements on other available signals or on any normal pilot signals, e.g., CRS in LTE. The use of CRS for positioning measurements is possible but may lead to possible quality degradation and worse positioning accuracy.

In one embodiment, the network node 32, 52 is constrained in its selection of a primary carrier to select a new primary carrier that contains the PRS. In addition, when selecting the new primary carrier, the network node 32, 52 may have additional constraints.

One such constraint may be selecting a primary carrier that has the most favorable reference signal configuration in time and/or frequency domain (e.g., presence of PRS vs. CRS only, larger PRS bandwidth, shorter PRS periodicity, more consecutive positioning sub-frames in a positioning occasion, etc.). This will improve positioning measurement quality and/or lead to shorter measurement time.

Another primary carrier selection constraint may be selecting a primary carrier that has better radio conditions, e.g., 900 MHz instead of 2 GHz in case both contain the positioning reference signals. This will ensure better positioning measurement quality.

Still another primary carrier selection constraint may be selecting a primary carrier that transmits PRS (or transmits PRS within certain parameters) if the UE 12 uses at least certain specific client types or service types related to positioning.

An LCS Client is defined as a software and/or hardware entity that interacts with a LCS Server for the purpose of obtaining location information for one or more UEs. LCS Clients subscribe to LCS in order to obtain location information. LCS Clients may or may not interact with human users. The LCS Client is responsible for formatting and presenting data and managing the user interface (dialogue). The LCS Client may reside in the UE 12 or SUPL-Enabled Terminal (SET), but it could also be on the network side (e.g., network maintenance services or base stations positioning themselves). The Client Type information is very important in practice since it allows for configuring LCS QoS discrimination in a flexible way. The following Client Types exist in UTRAN and E-UTRAN: Emergency Services, Value Added Services, PLMN Operator Services, Lawful Intercept Services, PLMN Operator Broadcast Services, PLMN Operator Operation and Maintenance Services, PLMN Operator Anonymous Statistics Services, and PLMN Operator Target MS Services Support. One example of selective carrier switching based on Client Type is: select as the primary carrier only a carrier with a large enough (e.g. >=5 MHz) PRS transmission bandwidth when the Client Type corresponds to emergency services, and allow switching to carriers with 1.4 MHz bandwidth for commercial services.

Service Type is an attribute of specific LCS that may be provided by the LCS client. The LCS Client may also provide the service identity, which can then be mapped by the server to a certain Service Type which may also be verified against the LCS profile and the subscription.

Enabling of Reference Signals for Positioning on a Component Carrier

All component carriers in a network 10 may not be transmitting the positioning reference signals. Therefore a situation may arise when a number of UEs 12 interested in positioning are assigned the same primary carrier, which does not currently transmit the positioning reference signals. In the prior art, the network node or the positioning node would have to configure measurement gaps or compressed mode gaps to perform the positioning measurements on a secondary carrier that transmits the positioning reference signals.

In one embodiment, if more than K users have the same primary carrier, and that carrier is not currently transmitting the reference signals for positioning, then the network node 32, 52 (e.g. eNode B) initiates the transmission of the reference signals for positioning. As a general rule, the K users may be any type of users. However as a special case the number of K users may belong to a certain class (e.g. low, medium or high priorities) and/or using a certain service type and/or having a certain client type.

In one embodiment, in order to reduce the reference signal overhead, the transmission of the reference signals on a particular component carrier may be terminated when certain conditions are met. For example if less than L users have the same primary carrier, and that carrier is currently transmitting the reference signals for positioning, then the network node 32, 52 (e.g. eNode B) may stop the transmission of the reference signals for positioning on the carrier. As a general rule, the L users may be any type of users. However as a special case the number of L users may belong to a certain class (e.g. low, medium or high priorities) and/or using a certain service type and/or having a certain client type.

Carrier Hopping for Positioning

Positioning occasions, when the positioning reference signals are transmitted, occur sparsely in time (e.g., 3GPP TS 36.211 specifies PRS periodicity of minimum 160 ms and maximum 1280 ms). However, different component carriers may have different configurations. In an embodiment wherein a multi-carrier network 10 transmits PRS on more than one component carrier, the positioning occasions are shifted in time on different carriers, so that more than one positioning occasion becomes available over several carriers within the PRS period, e.g., more than one positioning occasion in 160 ms PRS periodicity. A certain pattern can be applied for such multi-carrier PRS configurations, e.g., 40 ms step or time shifting between positioning occasions among carriers in a four-carrier system, with 160 ms PRS periodicity in each carrier. The UE 12 conducting positioning measurements, instead of measuring in measurement gaps, hops between the carriers to avoid using the gaps. That is, the UE 12 measures PRS on a component carrier, which does not require gap. In one embodiment hopping implies temporarily switching the primary carrier (e.g., at least for positioning measurements) so that after a certain period the UE 12 returns to the original primary carrier.

Positioning Method Selection in Inter-RAT Multi-Carrier Network

In one embodiment, a positioning method is selected depending upon the main or primary RAT and the primary carrier, with which a dynamic set of available positioning methods is associated. In a multi-carrier network 10 the inter-RAT positioning measurements are performed in gaps or using CM pattern. In this embodiment, at least on one carrier, the positioning measurements are performed without the need for measurement gaps or CM pattern.

For example, consider a multi-carrier HSPA/LTE network 10. If the main or primary carrier belongs to the LTE, and OTDOA is supported and configured by the network 10, and OTDOA is supported by the UE 12, then OTDOA RSTD measurements are configured for the UE 12. On the other hand, if the primary carrier belongs to UTRA FDD, then OTDOA SFN-SFN type 2 measurements are configured for the UE 12.

As another example, consider a GSM/LTE multi-carrier network 10. In GSM the equivalent of OTDOA based method is called enhanced observed time difference (E-OTD). The E-OTD relies on the Reference Time Difference (RTD) measurements performed by the UE 12 over signals transmitted by the GSM Base Transceiver Station (BTS). If the primary carrier belongs to the GSM, and E-OTD is supported, then E-OTD RTD measurements are configured for the UE 12. Otherwise (i.e., when primary carrier is LTE), then the LTE OTDOA RSTD measurements are configured for the UE 12.

These examples may be generalized to inter-RAT multi-carrier networks 10 including three or more RATs, e.g., GSM/HSPA/LTE. As a general rule, the OTDOA measurements pertaining to the RAT that is used in the primary network 30, 50, are configured in a UE 12 for performing OTDOA positioning measurements.

Positioning Method Switching in Inter-RAT Multi-Carrier Network

In an inter-RAT, multi-carrier network 10, the primary and secondary carriers that belong to different RAT (e.g. LTE and HSPA) may be changed at any time. In one embodiment, when changing the main carrier, the positioning method is also changed. A positioning method is selected from the dynamic set of available positioning methods corresponding to the RAT of the primary carrier, e.g., LTE OTDOA if the primary carrier belongs to LTE and the desired method is a TDOA-like method.

Signaling of Primary Carrier Information to Location Services Network Node

In order to perform various actions by the network 10 and/or a location services node 40, 54, in one embodiment the network node 32, 53 that switches the primary carrier in an intra-RAT or inter-RAT multi-carrier network 10 signals the location services node 40, 54 (e.g., E-SMLC) or the node controlling mobility (e.g., MME which then in turn informs E-SMLC) about the primary carrier/RAT used by the UE 12. The network node 32, 52 may also signal a potential list of the primary carriers/RATs that can be assigned to the UE 12.

In one embodiment, the UE 12 may also signal the location services node 40, 54 (e.g. E-SMLC) about the primary carrier/RAT used by the UE 12. For example, the UE 12 can inform the location services node 40, 54 (e.g. E-SMLC) at the start of the positioning session, when reporting its capabilities, or during the session. The UE 12 may signal this information to the location services node 40, 54 upon receiving a request from any network node 32, 52, 40, 54, e.g., E-SMLC, eNode B, etc.

Figure 7:
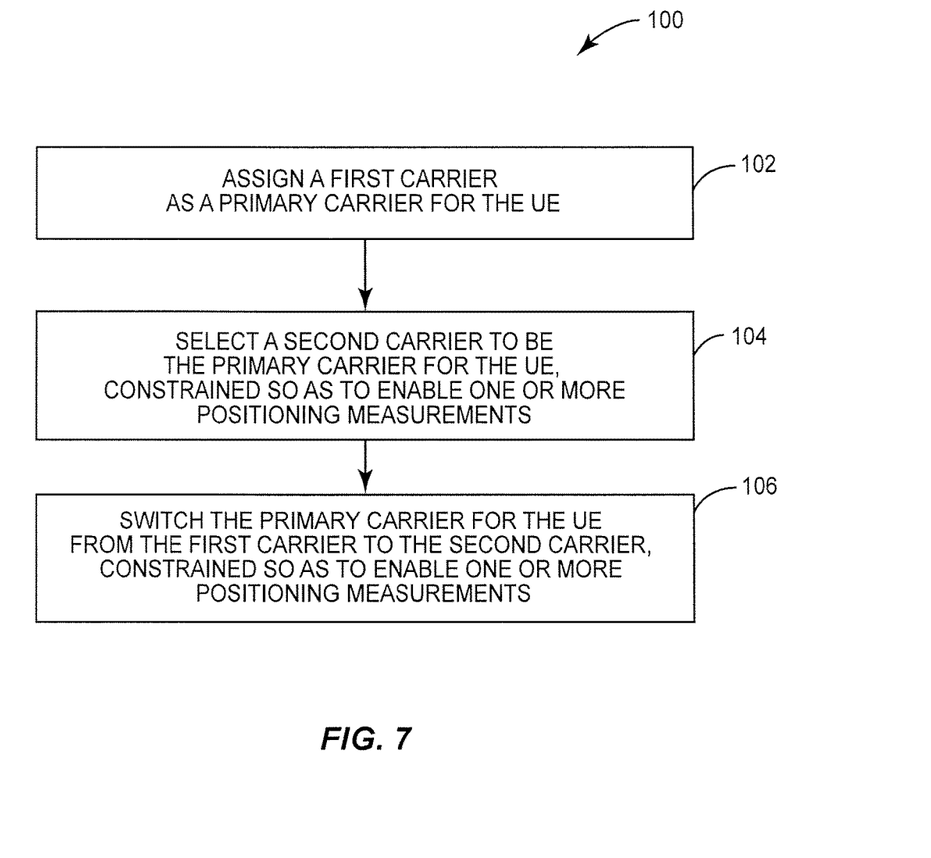
FIG. 7 is a flow diagram of a method of positioning-aware carrier switching for a UE, by a serving node of the UE in a multi-carrier wireless communication network.

FIG. 7 depicts a method 100 of positioning-aware carrier switching for UE 12, by a serving node 32, 52 of the UE 12 in a multi-carrier wireless communication network 12. The serving node 32, 52 assigns a first carrier as a primary carrier for the UE 12 (block 102), and transmits to the UE 12 communication and control signals modulated onto the first carrier frequency. The serving node 32, 52 selects a second carrier to be the primary carrier for the UE 12 (block 104), and switches the primary carrier for the UE 12 from the first carrier to the second carrier (block 106). In various embodiment, either the new primary carrier selection (block 104), or the switching of the primary carrier from the first to the second carrier (block 106), or both, are constrained so as to enable one or more positioning procedures to determine the geographic position of the UE 12.

The constraints are described in detail above. Briefly, the new primary carrier selection (block 104) may be constrained to select a carrier that transmits PRS, or that has more favorable configuration of PRS, or more favorable transmission characteristics, etc. Similarly, the primary carrier switching (block 106) may be constrained by being delayed until an ongoing measurement procedure completes, by performing the switching prior to beginning a positioning procedure, by the type or QoS of the requested positioning procedure, and the like. Other constraints include reconfiguring measurement gaps in the UE 12 to accommodate a primary carrier switch, enabling/disabling PRS transmission on one or more carriers, configuring PRS transmissions to enable carrier hopping, aligning positioning methods with RATs, signaling carrier/RAT information to network nodes 40, 54, and the like, as described in greater detail herein above.

Figure 8:
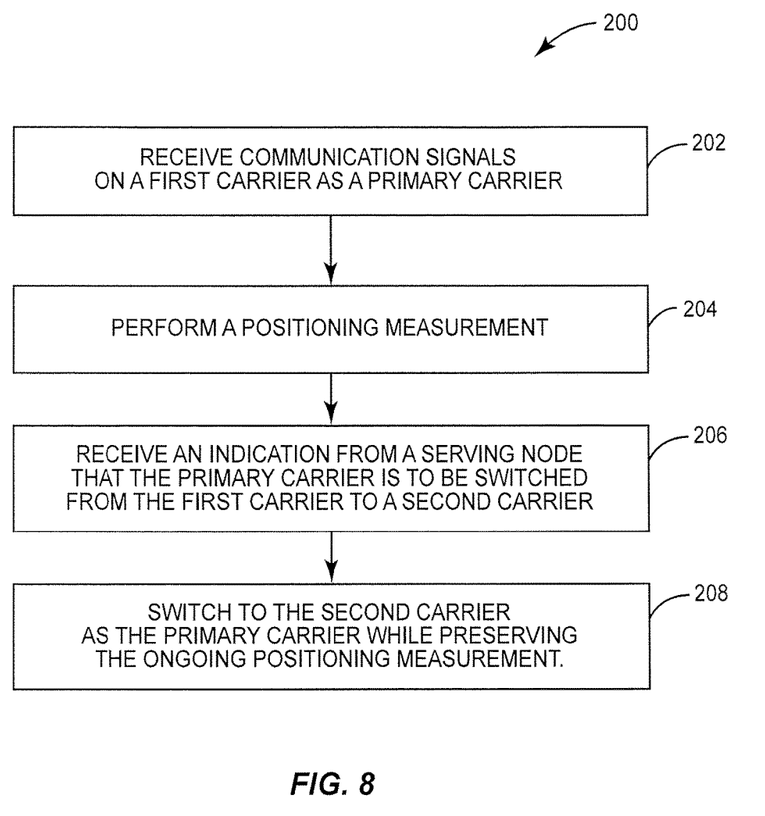
FIG. 8 is a flow diagram of a method of positioning-aware carrier switching by a UE operative in a multi-carrier wireless communication network.

FIG. 8 depicts a method 200 of positioning-aware carrier switching by a UE 12 operative in a multi-carrier wireless communication network 10. The UE 12 receives communication signals from the network 10 on a first carrier as a primary carrier (block 202). The UE 12 performs one or more positioning measurements (block 204), such as OTDOA measurements on PRS, receipt and processing of GPS signals, or the like. The UE 12 may perform a positioning procedure using the positioning measurements, or alternatively may transmit the positioning measurements to a location services network node 40, 54 for the positioning procedure. The UE 12 then receives an indication from a serving node 32, 52 that the primary carrier is to be switched from the first carrier to a second carrier (block 206). The UE 12 switches to the second carrier as the primary carrier while preserving the ongoing positioning measurements (block 208). In various embodiments, this may entail delaying the switch to the second carrier until the positioning measurements are complete, suspending the positioning measurements and restarting them on the new primary carrier, transmitting information about the primary carrier switch to other network nodes 40, 52, and the like, as described in greater detail herein above.

By implementing positioning-aware constraints on primary carrier switching in a serving node 32, 52 and/or UE 12 of a multi-carrier wireless communication network 10, interruption and delay in obtaining positioning measurements may be avoided. This enables positioning measurements with better accuracy and in shorter time period, both of which may be critical for many applications, such as emergency calls. Embodiments of the present invention also enable faster positioning measurements and better accuracy in inter-RAT multi-carrier networks 10.

Embodiments of the present invention are applicable to any type of UE (e.g., cell phone, USB, wireless broadband module, target device or wireless relay node, etc.) which is capable of performing the relevant positioning measurements for the purpose of determining a position.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of positioning-aware carrier switching for User Equipment (UE), performed by a serving node of the UE in a multi-carrier wireless communication network, wherein the UE is served by at least two carriers, the method comprising:
   assigning a first carrier as a primary carrier for the UE;
   selecting a second carrier to be the primary carrier for the UE; and
   switching the primary carrier for the UE from the first carrier to the second carrier;
   wherein the serving node constrains performing at least one of the selecting and switching steps at the serving node so as to enable one or more positioning measurements to be performed by the UE; and
   wherein switching the primary carrier for the UE from the first carrier to the second carrier comprises treating the carrier switch as a handover procedure for an ongoing location service session; and
   wherein switching the primary carrier for the UE from the first carrier to the second carrier comprises:
      ascertaining whether positioning measurements for the UE are ongoing by obtaining an indication of the time positioning measurements began;
      switching the primary carrier if the positioning measurements have been ongoing for less than a predetermined duration; and
      delaying switching the primary carrier until the positioning measurements are complete if the positioning measurements have been ongoing for more than the predetermined duration.

2. The method of claim 1 wherein ascertaining whether positioning measurements for the UE are ongoing comprises requesting positioning measurement information from a location services network node.

3. The method of claim 1 wherein ascertaining whether positioning measurements for the UE are ongoing comprises requesting positioning measurement information from the UE.

4. The method of claim 1 further comprising configuring measurement gaps on the second carrier to align the UE measurement occasions with transmissions of signals on the second carrier used for positioning measurements.

5. The method of claim 4 wherein the measurement gap information comprises a predetermined gap pattern.

6. The method of claim 4 wherein the measurement gap information comprises directing the UE not to use measurement gaps when Positioning Reference Signals are transmitted on the second carrier.

7. The method of claim 6 wherein configuring the UE to not use measurement gaps is in response to a predetermined rule.

8. The method of claim 1 wherein selecting a second carrier to be the primary carrier for the UE comprises selecting a second carrier that transmits Positioning Reference Signals (PRS).

9. The method of claim 8 further comprising selecting, from a plurality of potential primary carriers that transmit PRS, a second carrier that has the most favorable PRS configuration in the time or frequency domain.

10. The method of claim 8 comprising selecting, from a plurality of potential primary carriers that transmit PRS, a second carrier that has the most favorable radio conditions for the UE.

11. The method of claim 1 further comprising, if at least a first predetermined number of UEs are assigned the second carrier as a primary carrier, transmitting Positioning Reference Signals (PRS) on the second carrier.

12. The method of claim 1 further comprising, if fewer than a second predetermined number of UEs are assigned the second carrier as a primary carrier, ceasing the transmission of Positioning Reference Signals (PRS) on the second carrier.

13. The method of claim 1 further comprising:
   transmitting Positioning Reference Signals (PRS) on the first and second carriers, the PRS transmissions staggered in time; and
   switching the primary carrier for the UE to a carrier prior to a PRS transmission on that carrier.

14. The method of claim 1 wherein the serving node transmits the first and second carriers according to a first Radio Access Technology (RAT), and wherein the UE receives communication signals on a third carrier transmitted by a different serving node in a second RAT, further comprising:
   configuring the UE to perform positioning measurements according to a positioning method selected in response to the primary carrier.

15. The method of claim 14 further comprising, when switching the primary carrier for the UE to the second RAT, configuring the UE to perform positioning measurements according to a positioning method selected in response to the second RAT.

16. The method of claim 14 further comprising sending a location services network node an indication of the RAT of the primary carrier for the UE.

17. A serving node of a multi-carrier wireless communication network, the serving node comprising:
   a transceiver operative to simultaneously transmit to User Equipment (UE) communication signals modulated onto two or more carriers, wherein a first carrier of the two or more carriers is designated as a primary carrier for a particular UE; and
   a controller operative to control the transceiver, and further operative to select a second carrier to be the primary carrier for the UE, and to control the transceiver to switch the primary carrier for the UE from the first carrier to the second carrier;

wherein the controller is further operative to constrain performing at least one of the selecting and switching operations by the controller so as to enable one or more positioning measurements to be performed by the UE; and wherein the controller is further operative to treat the carrier switch as a handover procedure for an ongoing location service session;

wherein the controller is operative to switch the primary carrier for the UE from the first carrier to the second carrier by:
    ascertaining whether positioning measurements for the UE are ongoing by obtaining an indication of the time positioning measurements began;
    switching the primary carrier if the positioning measurements have been ongoing for less than a predetermined duration; and
    delaying switching the primary carrier for the UE from the first carrier to the second carrier until the positioning measurements are complete if the positioning measurements have been ongoing for more than the predetermined duration.

18. The node of claim 17 wherein ascertaining whether positioning measurements for the UE are ongoing comprises requesting positioning procedure information from a location services network node.

19. The node of claim 17 wherein ascertaining whether positioning measurements for the UE are ongoing comprises requesting positioning procedure information from the UE.

20. The node of claim 17 wherein the controller is operative to configure measurement gap information for the UE to align with positioning data transmissions on the second carrier.

21. The node of claim 20 wherein the measurement gap information comprises a predetermined gap pattern.

22. The node of claim 20 wherein the measurement gap information comprises directing the UE not to use measurement gaps when Positioning Reference Signals are transmitted on the second carrier.

23. The node of claim 17 wherein the controller is operative to select a second carrier to be the primary carrier for the UE by selecting a second carrier that transmits Positioning Reference Signals (PRS).

24. The node of claim 23 wherein the controller is operative to select, from a plurality of potential primary carriers that transmit PRS, a second carrier that has the most favorable PRS configuration in the time or frequency domain.

25. The node of claim 23 wherein the controller is operative to select, from a plurality of potential primary carriers that transmit PRS, a second carrier that has the most favorable radio conditions for the UE.

26. The node of claim 17 wherein the controller is further operative to transmit Positioning Reference Signals (PRS) on the second carrier if at least a first predetermined number of UEs are assigned the second carrier as a primary carrier.

27. The node of claim 17 wherein the controller is further operative to cease the transmission of Positioning Reference Signals (PRS) on the second carrier if fewer than a second predetermined number of UEs are assigned the second carrier as a primary carrier.

28. The node of claim 17 wherein the controller is further operative to:
    transmit Positioning Reference Signals (PRS) on the first and second carriers, the PRS transmissions staggered in time; and
    switch the primary carrier for the UE to a carrier prior to a PRS transmission on that carrier.

29. The node of claim 17 wherein the controller is operative to transmit the first and second carriers according to a first Radio Access Technology (RAT), and wherein the UE receives communication signals on a third carrier transmitted by a different serving node in a second RAT, and wherein the controller is further operative to:
    configure the UE to perform positioning measurements according to a positioning node selected in response to the primary carrier.

30. The node of claim 29 wherein the controller is further operative to configure the UE to perform positioning measurements according to a positioning method selected in response to the second RAT, when switching the primary carrier for the UE to the second RAT.

31. The node of claim 29 wherein the controller is further operative to send to a location services network node an indication of the RAT of the primary carrier for the UE.

* * * * *